(12) United States Patent
Hutcherson (10) Patent No.: US 8,762,208 B2
(45) Date of Patent: Jun. 24, 2014

(54) MOBILE COMPUTING BASED CENTRALIZED MENU SYSTEM

(75) Inventor: Robert Clay Hutcherson, London (CA)

(73) Assignee: Binnj, Inc., London, Ontario (CA)

( * ) Notice: Subject to any disclaimer, the term of this patent is extended or adjusted under 35 U.S.C. 154(b) by 187 days.

(21) Appl. No.: 12/954,780

(22) Filed: Nov. 26, 2010

(65) Prior Publication Data

US 2014/0040048 A1    Feb. 6, 2014

(51) Int. Cl.
*G06Q 30/00* (2012.01)
*G06Q 50/30* (2012.01)

(52) U.S. Cl.
USPC ............... 705/15; 705/34; 705/40; 235/379; 235/383; 235/384; 235/385

(58) Field of Classification Search
None
See application file for complete search history.

(56) References Cited

U.S. PATENT DOCUMENTS

| | | | |
|---|---|---|---|
| 6,982,733 B1 * | 1/2006 | McNally et al. | 715/810 |
| 7,010,267 B2 * | 3/2006 | Vanluijt et al. | 455/41.2 |
| 7,831,475 B2 * | 11/2010 | Baril et al. | 705/16 |
| 2002/0133418 A1 * | 9/2002 | Hammond et al. | 705/26 |
| 2004/0034564 A1 | 2/2004 | Liu | |
| 2009/0132492 A1 | 5/2009 | Satoh et al. | |
| 2009/0157752 A1 * | 6/2009 | Gonzalez | 707/104.1 |
| 2009/0237224 A1 * | 9/2009 | Sugurappa Angadi et al. | 340/286.09 |

OTHER PUBLICATIONS

International Searching Authority, PCT/CA2011/050734 International Search Report and Written Opinion.

* cited by examiner

*Primary Examiner* — Fateh Obaid
(74) *Attorney, Agent, or Firm* — Brion Raffoul (57) ABSTRACT

Systems and methods related to an individualized menu system for use by customers in a retail environment. Multiple mobile computing devices are in communication with a database server from which the mobile computing devices retrieve menu related data items. The menu related data items are then used to present a menu to the customer by way of the mobile computing devices. The mobile computing devices are authenticated by the database server and communicate with the database server using a secure communications protocol. Each menu related data item in the database server is individually editable by an administrative user and edits are not propagated to the mobile computing devices until they are committed as such by the administrative user.

11 Claims, 5 Drawing Sheets

MOBILE COMPUTING BASED CENTRALIZED MENU SYSTEM

FIELD OF THE INVENTION

The present invention relates to menu systems and, more particularly, relates to a paperless menu system for use in retail environments.

BACKGROUND OF THE INVENTION

The technology and communications revolution of the past decade has transformed everyday life in modern-day society. People now access almost everything electronically. From ebooks to electronic newspapers, to the ubiquitous email, the $21^{st}$ century is fast moving away from the analog world of paper or printed media. This should not be a surprise as the paper medium is not only resource intensive but also quite inconvenient in today's fast moving world. Printed material cannot be easily edited and any edits or changes require a reprint of the material as well as a redistribution of the reprinted material. As well, printed material requires the consumption of limited (and some say dwindling) natural resources. Such resources can be expensive and those who are slaved to printed media are less able to adjust to fast moving market forces and developments.

In the retail space and, more precisely, in the restaurant field, menus can represent a periodic non-recoverable expense which can tie restaurants to sometimes undesired circumstances. When restaurants print off their menus, they are locked into the prices listed on the menu. As well, restaurants are tied to the menu items presented on their printed menus. Changing market conditions (such as the price of the raw food materials or the stock of raw food materials that a restaurant may have) cannot be taken into account in the menus as changing the items or their prices would require a reprinting of the menus. While the reprinting of a menu may not be as much of an issue for small establishments, large restaurant chains are stuck with not just their menu offerings but also with the prices for those offerings.

In addition to the above drawbacks, paper or printed menus have the added drawback of requiring high input resource costs (typesetting costs, layout costs, raw material costs, etc.). Another drawback to printed menus is that volatile raw material costs for foodstuffs or labor (ie minimum wage increases) cannot be taken into account when preparing the printed menus. As such, when food or labor prices go up, the prices at which the restaurant sells its products cannot similarly go up as the printing costs for new menus, especially for large restaurant chains, can be quite prohibitive.

Yet a further drawback to printed menus is that current menus inadvertently promote the concept of keeping the customer inside the restaurant. Customers have to wait for wait staff with the printed menus and provide their selections to the wait staff. Only after this process would the customers receive their food. When it comes time to pay for the meal, customers have to catch the wait staff's attention, wait for the bill, and wait for the wait staff to process their payment before they can leave. Unfortunately, with the busy schedule of today's consumers, such a time-consuming process can be irritating. For families with multiple small children just looking for a quick meal, the process can be an ordeal as they try to keep the children in check while waiting for the menu, the food, and, eventually, the bill.

Based on the above, there is therefore a need for methods, systems, and inventions that avoid or at least mitigate the issues noted above.

SUMMARY OF INVENTION

The present invention provides systems and methods related to an individualized menu system for use by customers in a retail environment. Multiple mobile computing devices (which may be provided by the customer) are in communication with a database server from which the mobile computing devices retrieve menu related data items. The menu related data items are then used to present a menu to the customer by way of the mobile computing devices. The mobile computing devices are authenticated by the database server and communicate with the database server using a secure communications protocol. Each menu related data item in the database server is individually editable by an administrative user and edits are not propagated to the mobile computing devices until they are committed as such by the administrative user.

In a first aspect, the present invention provides a system for providing menus to customers in a retail establishment, the system comprising:
  a plurality of mobile computing devices, each mobile computing device being for use by one or more of said customers
  a database server containing menu related data, said menu related data being sent to said plurality of computing devices for presentation to said customers
  wherein
  each of said plurality of mobile computing devices is coupled to said database server to receive said menu related data
  each of said plurality of mobile computing devices is authenticated to said database server to thereby allow each of said plurality of mobile computing devices to receive said menu related data
  each one of said plurality of mobile computing devices presents menu items to said customers, said menu items being based on said menu related items.

In a second aspect, the present invention provides a method for providing an interactive menu to a customer at a retail establishment, the method comprising:
  a) providing said customer with a mobile computing device
  b) accessing a database server using said mobile computing device
  c) retrieving menu related data items from said database server using a secure communications protocol
  d) presenting said customer with an interactive menu using said menu related data items retrieved in step c).

In a third aspect, the present invention provides a system for providing an interactive menu for use by customers in a restaurant environment, the system comprising:
  a plurality of mobile computing devices, each mobile computing device being for presenting said interactive menu to a customer at said restaurant environment
  at least one database server in data communication with said plurality of mobile computing devices, the or each database server containing menu related data items used by said mobile computing devices to present said menu to said customers.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
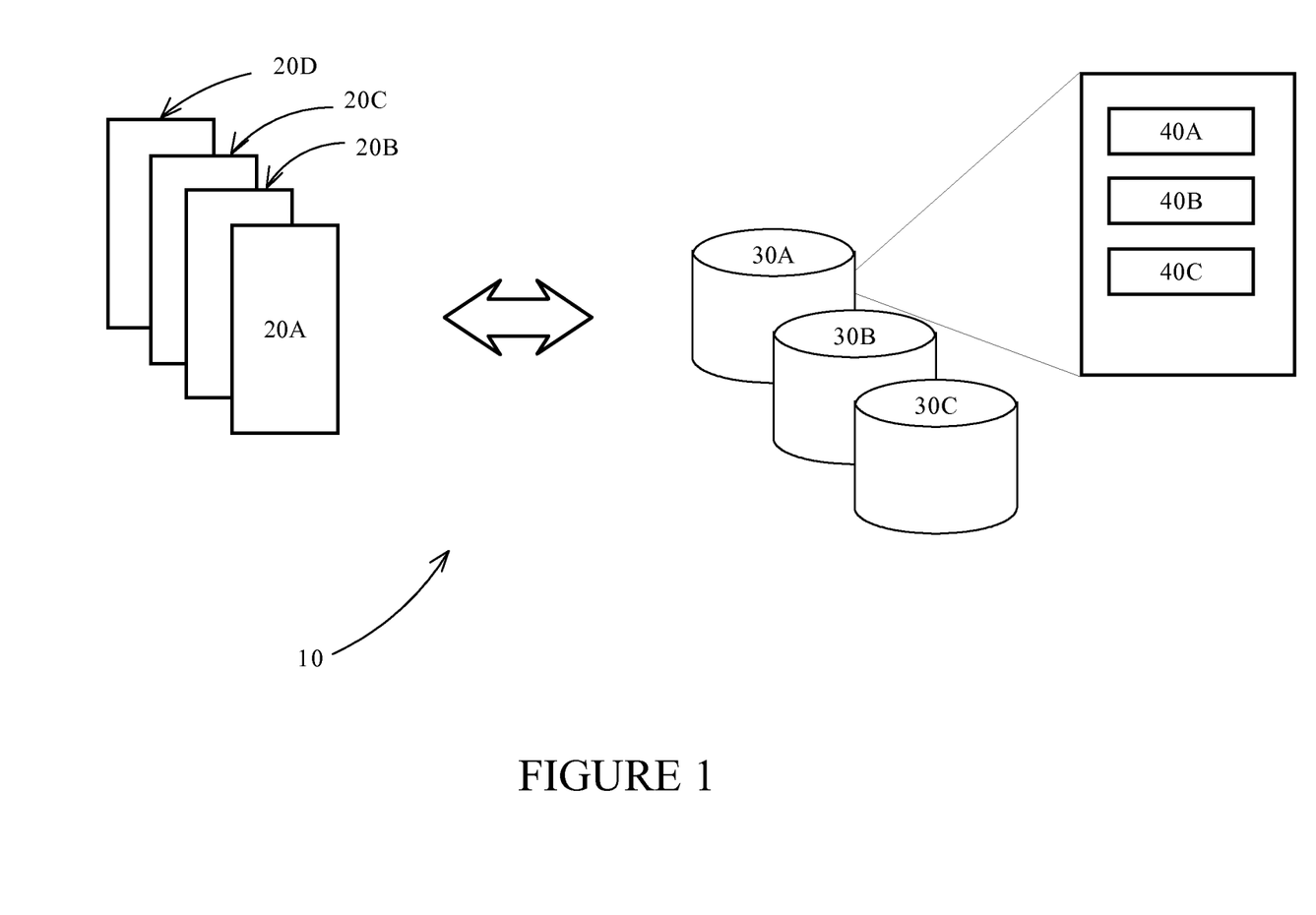
FIG. 1 is a block diagram illustrating a system for providing customers with a menu system using mobile computing devices.

Referring to FIG. 1, a system according to one aspect of the invention is illustrated. The system 10 has a number of mobile computing devices 20A, 20B, 20C, 20D ... 20n. Each mobile computing device is for use by a customer in a retail environment (such as a restaurant, retail store, etc.). Each computing device is in communication with at least one database server 30A, 30B, 30C. Each database server contains menu related data items 40A, 40B, 40C, each of which is retrievable by the mobile computing device 20A ... 20n. Each mobile computing device 20A ... 20n uses the menu related data items 40A, 40B, 40C to present a menu to customers. The menu can be a combination of pictures, text, video, graphics, and any other multimedia elements. The menu can also indicate not just the menu items and their descriptions but also their price, nutritional information, allergy alerts, and various other data which may be of use or interest to a customer.

As can be imagined, in a restaurant environment, the menu items presented to the customer can consist of food or drink items and other items which may be sold at restaurants, including souvenir items, books, music, etc., etc. In a retail store environment, the menu items may include the items on sale at the store, items which may be ordered through the store, as well as services which may be offered by or through the retail store. The menu items may also be presented to the customer by way of the mobile computing device in conjunction with suitable advertisement from sponsors or those who have paid for the advertisement space.

Figure 2:
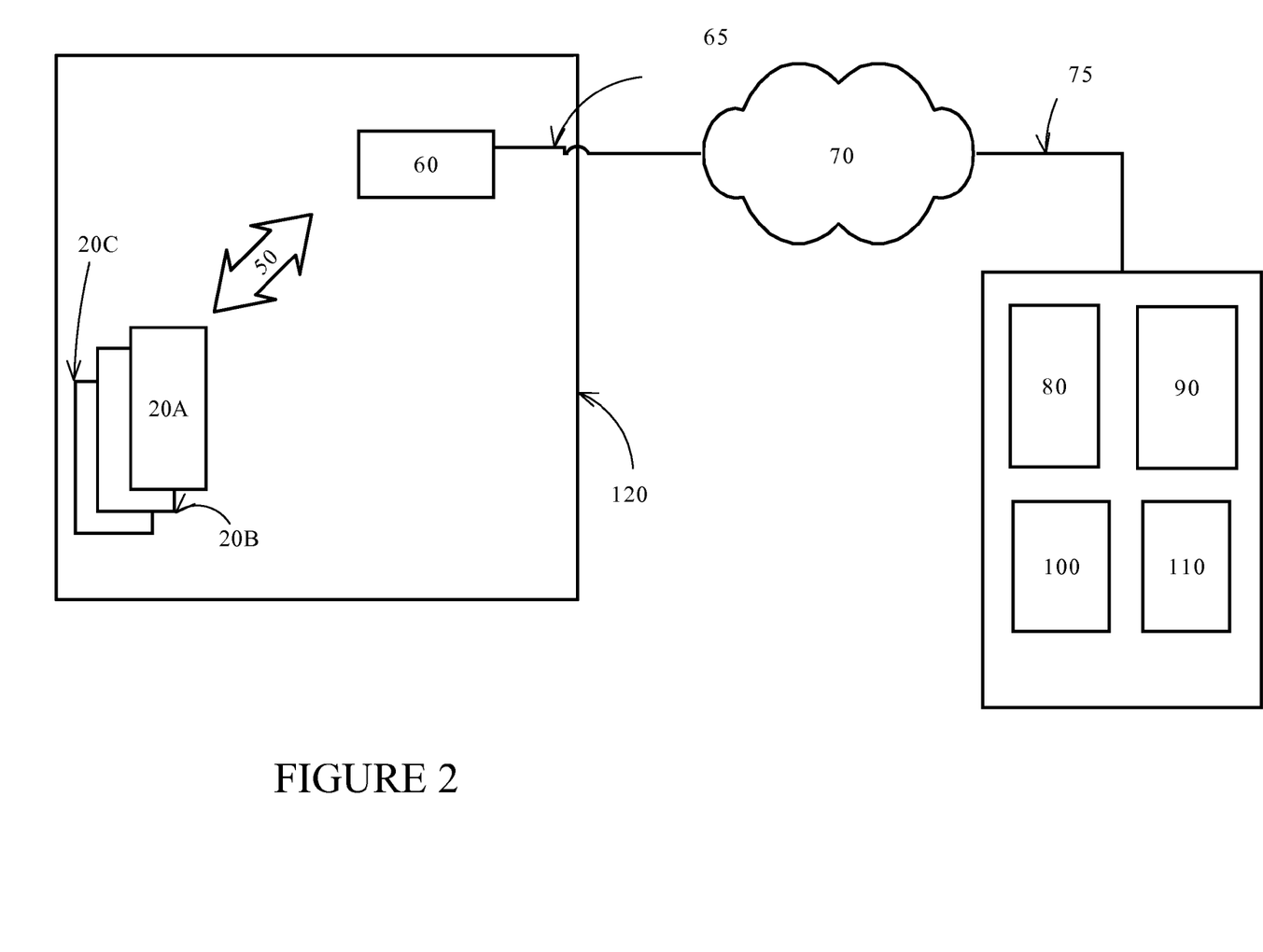
FIG. 2 is a block diagram of a system as illustrated in FIG. 1 illustrating the details of the system.

Each mobile computing device has a communications link with one of the at least one database server 30A, 30B, 30C. The communications link may be wired or wireless. In one embodiment (see FIG. 2), a local area network using wireless links 50 from the mobile computing device to a LAN endpoint 60 are used. From the LAN endpoint, a connection 65 to the Internet 70 is used. From the Internet 70, a connection 75 links to the database server 30. As illustrated in FIG. 2, the term "database server" may encompass various components, including a security server 80, an optional load balancer 90, a database management system 100, and a database 110 containing the actual menu related data items. An optional proxy server/web cache 115 may be used between the LAN endpoint and the mobile computing devices. In the configuration in FIG. 2, the mobile computing devices and the LAN endpoint are physically remote from the database server and are within the premises of the retail/restaurant establishment 120. The database server 30 may be located in a dedicated server location.

It should be noted that the term "wireless links" or "wireless communication" includes the use of different types of wireless technologies including but not limited to and including 802.11 (in all its versions and flavours), cellular network technologies (including 3G and beyond 3G), Bluetooth, wireless LAN, Wi-Fi.

Figure 3:
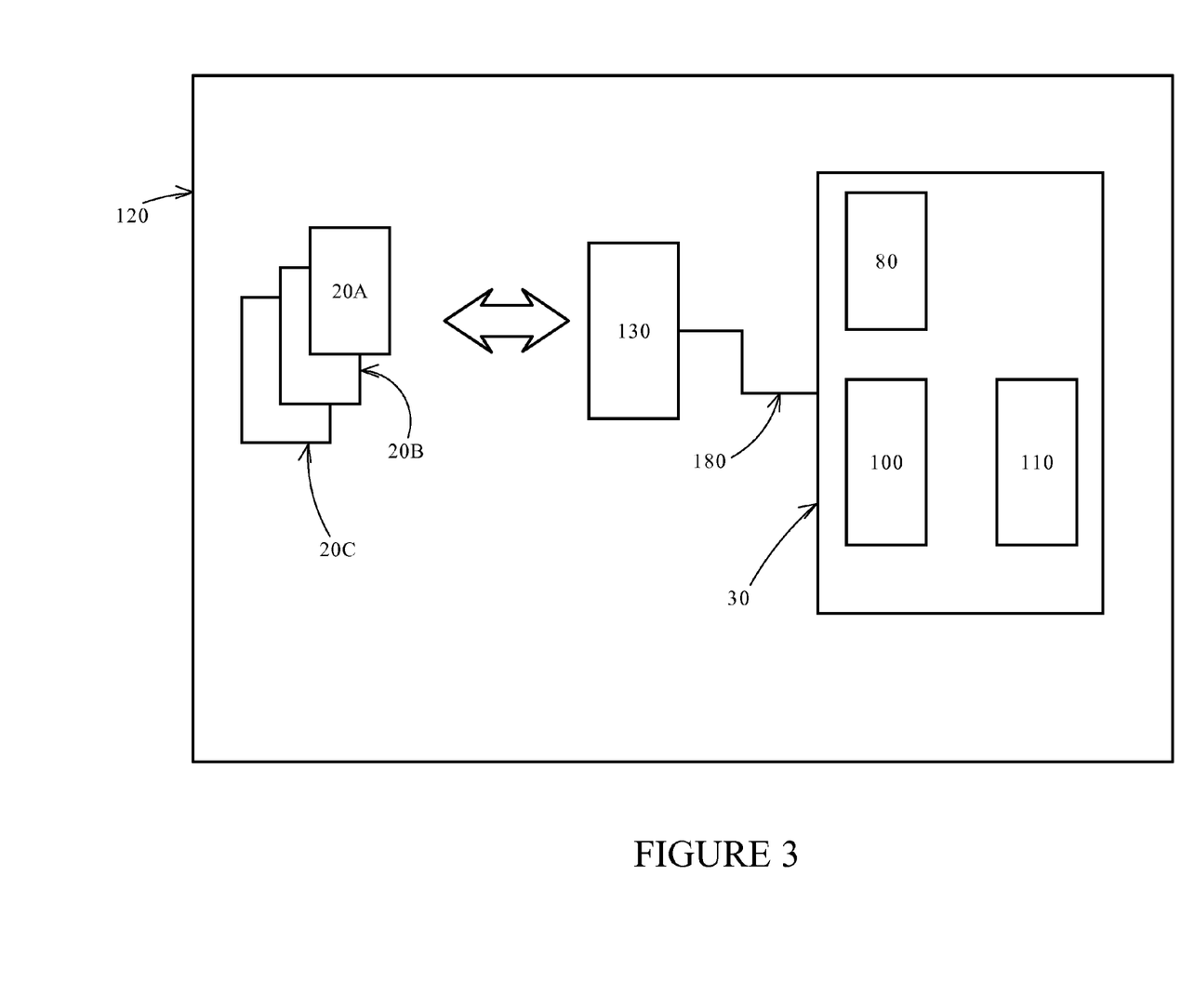
FIG. 3 is a block diagram of a variant of the system in FIG. 2.

Referring to FIG. 3, another configuration of the system 10 is illustrated. The mobile computing devices 20A-20C are in wireless communication with a wireless router 130 that is connected to a local area network (LAN) 140. The LAN couples the router (and thus the mobile computing devices) to the database server 30. The database server 30 is similar to that in FIG. 2, with a security server 80, a database management system 100, and a database 110. The system 10 is located at a retail establishment 120 and, as such, there is no need for any external network links. This configuration would be suitable for a single retail establishment where the menu related data items are controlled from within the establishment.

Figure 4:
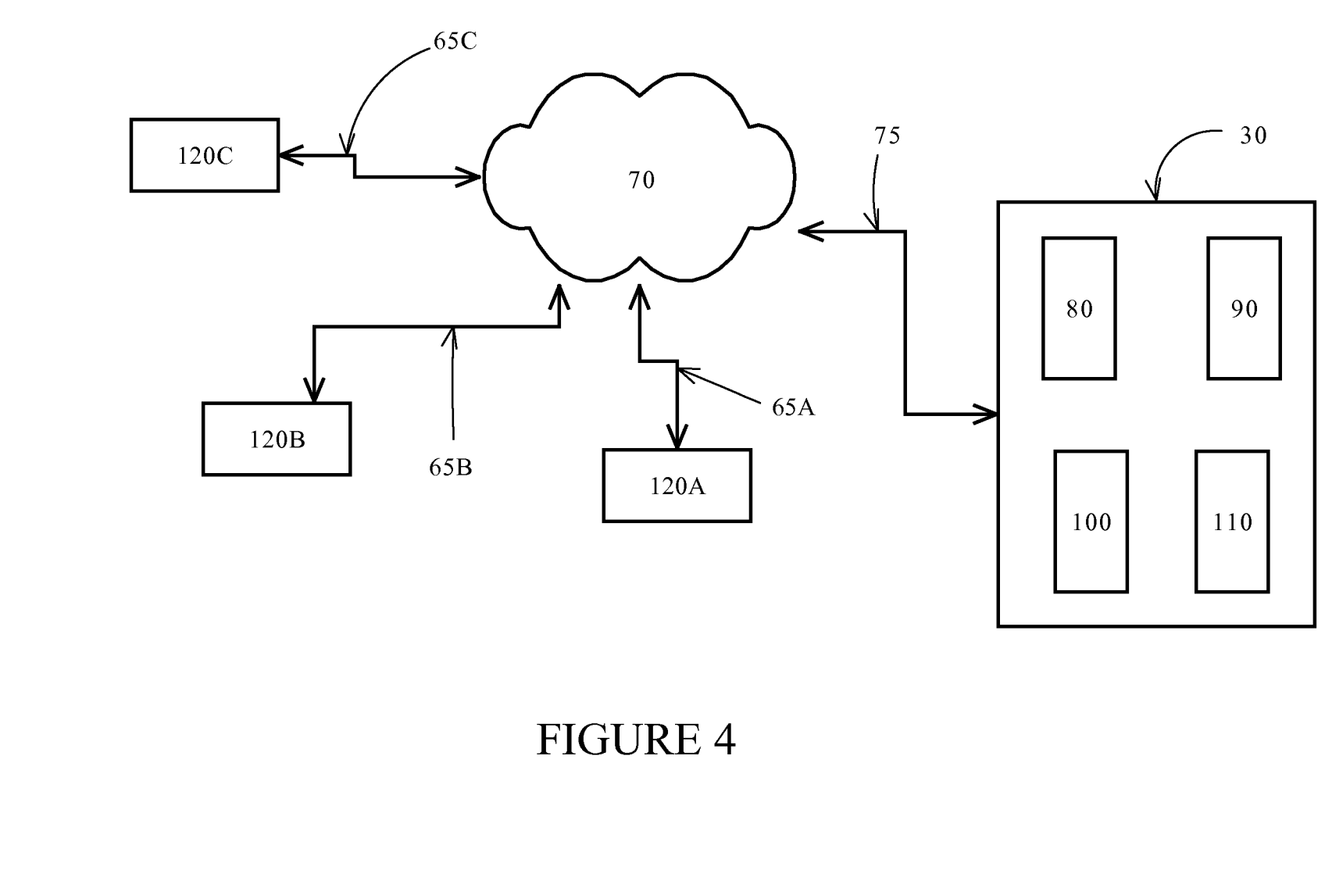
FIG. 4 is a block diagram of a macro system for managing multiple retail establishments using the system in FIG. 1.

Referring to FIG. 4, a configuration which may be used for an enterprise with multiple retail establishment branches is illustrated. A number of retail establishments 120A, 120B, 120C have similar menu offerings for their customers and may have a common owner. Each retail establishment is, internally, similar in nature and configuration with the retail establishment 120 illustrated in FIG. 2. Each retail establishment and its mobile computing devices are in communication with a database server 30 over the Internet 70 by way of links 65A, 65B, 65C and link 75. The various mobile computing devices in the various establishments 120A, 120B, 120C are thus retrieving the same (or similar) menu related data items from the database server 30. Of course, variations in the menu offerings, prices, and schedules between the various establishments 120A, 120B, 120C can be addressed by having slightly different menu related data items for the different establishments. The database server 30 is similar in configuration to the database server 30 illustrated in FIG. 2.

Regarding specific implementation details for the system described above, the mobile computing device 20A, 20b, 20C provided to the customer at the retail establishment can be a tablet computing device such as the iPad™ from Apple Computer Inc. Such tablet devices are generally equipped with a wireless networking interface such that they can connect to a wireless LAN. This capability can therefore be used by the tablet computing device to access the LAN in the retail establishment and, if necessary (as in the configurations in FIGS. 2 and 4), access the Internet to communicate with the database server 30. While not necessary, it is preferable, for a more seamless customer experience, that the tablet computing device be equipped with a touch screen interface. Other mobile computing devices other than tablet computing devices may be used as will be explained below.

The tablet computing device may, depending on the implementation, provide the customer with a menu derived from the menu related data items using a web browser or, preferably, a dedicated application. The menu related data items, which may be text, images, video, sound, or music data, is used to present a coherent menu to the customer, informing the customer of the retail establishment's products, services, and their prices. In a restaurant setting, the menu would detail the different food items, drinks, entrees, appetizers, desserts, and other items for sale at the restaurant. The menu would also include the prices for these items.

In some implementations, the menu presented to the customer may be relatively static, with customers only being presented with different pages of the menu. The customer may flip through the various menu offerings by flipping through the virtual pages displayed by the tablet computing device. The layout of the menu may be specifically predetermined to give a certain look and feel so that menus for different branches of the same restaurant chain would look and feel the same, thereby identifying the restaurant as a branch of that specific restaurant chain.

In other implementations, the menu presented to customers may be interactive, allowing the customer to learn more about the menu offerings. Customers may, by activating a menu item, be presented with more information regarding the item. Allergy alerts, ingredients used in its preparation, as well as nutritional information may be provided to the customer once the customer activates a menu item. Beverage (e.g. wine and/or beer or cocktail) and other food pairings (e.g. specific appetizers, salads, desserts with specific beverages or entrees) with various dishes and menu items can also be provided to the customer. In one embodiment, once a customer has selected a food or beverage item, a recommendation as to specific entrees, desserts, or other menu items which would complement the selected item may be brought to the customer's attention. These and other information may be presented to the customer by way of text, images, and video or audio recordings played back using the tablet computing device. Of course, a combination of these forms of presenting information to the customer may also be used.

As a further function, the mobile computing devices may present the customer with a digital survey to collect customer feedback regarding the customer's experience with the retail establishment. The survey may take the form of a simple multiple choice questionnaire or it may take the form of a more free-form fill-in-the-blanks questionnaire. The survey form may question the customer regarding the service he/she received, the quality of the menu offerings, the quality of the goods received (e.g. the food and beverage consumed), as well as any suggestions for improvement. Once the survey form has been completed, it can be transmitted by the mobile computing device to a suitable server so that the results can be gathered and analyzed.

It should be noted that multiple languages may also be supported by the menu system. As separate menu related data items, different language text, images, and other data items may also be stored in the database server. When a language switch is desired, the mobile computing device can attempt to connect to the database server to retrieve the relevant menu related data items that relate to the desired language.

The menu related data items retrieved from the database server by the mobile computing devices may be periodically refreshed by the mobile computing devices to ensure that the latest version of the data items are resident on the mobile computing device. Alternatively, the mobile computing device may refresh its data when a connection is available to it. In one implementation, a local server (local to the retail establishment where the mobile computing devices are being used) may provide a local storage unit for the menu related data items. Thus, instead of having the mobile computing devices periodically refresh their data directly from the database server, the refresh can be done more frequently from the local storage server. The local storage server (eg the proxy server 115 in FIG. 5) can perform regular and frequent updates of data directly from the database server. The mobile computing devices can therefore function even without a persistent and constant communications link with the database server. To ensure that the latest version of the menu related data items are on the mobile computing devices, a versioning system (wherein the data files are versioned so that different versions can readily be differentiated from older versions) may be used on the different computing devices.

Multiple storage options may be used by the mobile computing devices. As an example, the mobile computing devices may store the most recently retrieved menu related data items internally. Tablet computing devices and other mobile computing devices are usually equipped with onboard storage and, by storing the most recently retrieved menu related data items, a persistent and constant link to the database server or appropriate storage proxies are not required. By using this option, the mobile computing device may operate in essentially an "offline" mode in that the device only communicates with the database server or the suitable proxies when required for periodic updates. Alternatively, a storage proxy or, essentially, a storage cache server (which may be located at the retail establishment premises or at an off-site location) may be used with the mobile computing device retrieving menu related data items from the proxy or cache server as needed. In yet a further alternative, a cloud computing server or distributed computing server may be used by the mobile computing devices.

It should be noted that the mobile computing devices are preferably communicating with the database server via a secure communications protocol so that communications between the two are secure. This is the function of the security server 90, to ensure that the link between the mobile computing devices and the database server is secure. To this end, as the communications between mobile computing devices and the database server is over the internet, the HTTPS communications protocol (hypertext transfer protocol secure) may be used. The security server 90 may thus be an HTTPS server that secures communications between the mobile computing devices and the database server. Of course, other suitable secure communications protocols may be used depending on the implementation details.

In addition to the use of a secure communications protocol, each mobile computing device is authenticated and authorized to receive menu related data items from the database server. Unauthenticated devices which attempt to access the menu related items, even though they may be able to formulate the proper URL (in the implementation illustrated in FIG. 2) would not be able to receive the menu related data. Authentication may be done using built-in capabilities of the mobile computing devices or it may be done using the mobile computing device's internal identification number. As an example, if the mobile computing device is the iPad from Apple Computer Inc., the iPad's UDID may be used to confirm the identity of the mobile device trying to access the menu related data.

Figure 5:
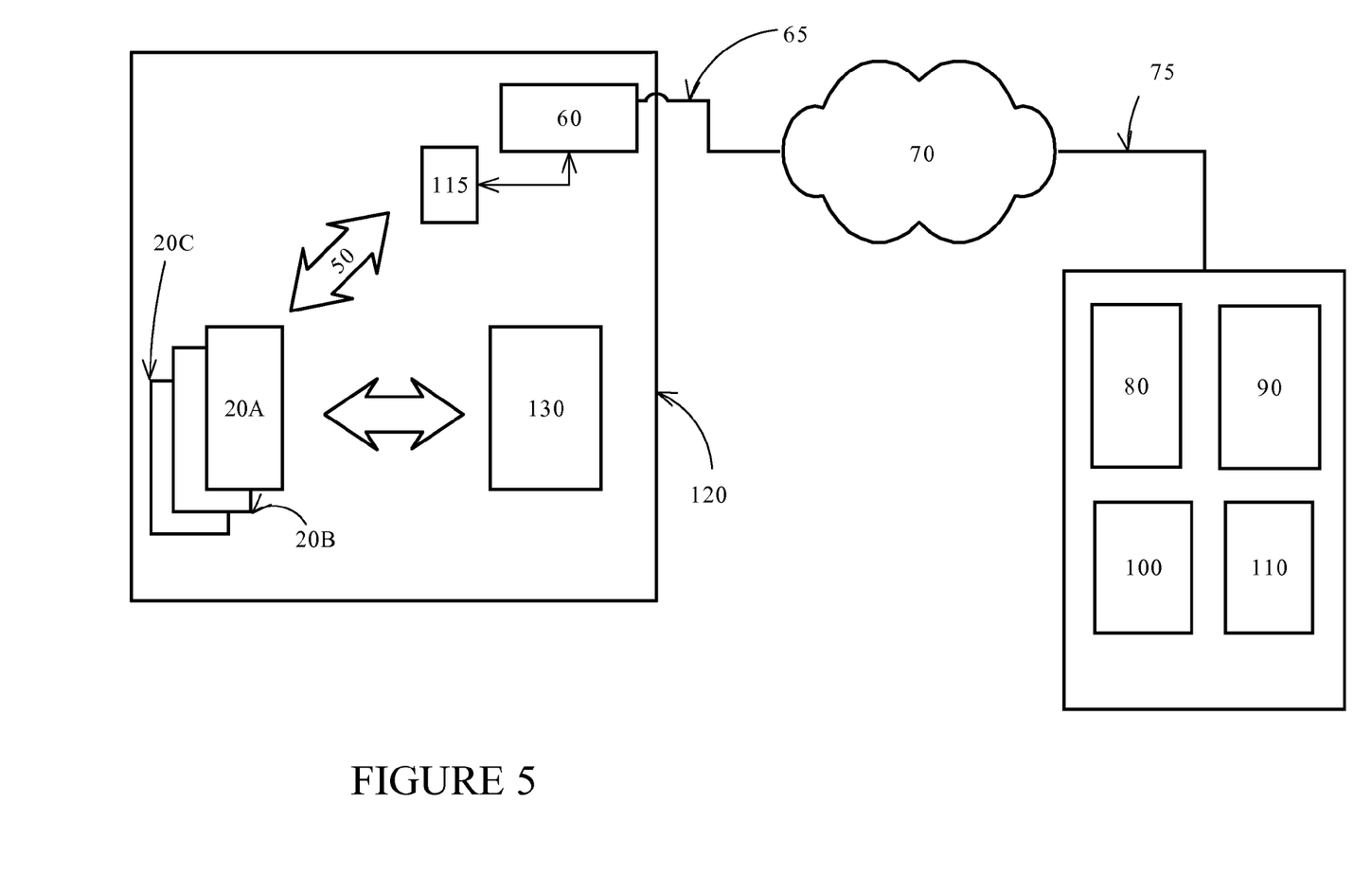
FIG. 5 is a block diagram of a variant of the system in FIG. 2 along with a point of sale system.

Referring to FIG. 5, another variant of the system 10 is illustrated. As can be seen, the system 10 further comprises a POS or point of sale system 130 that is in communication with the mobile computing devices. The point of sale system is similar to other point of sale systems used in retail establishments where retail staff (or wait staff in restaurants) enter orders and purchases for eventual fulfillment for the customer. The difference in the system in FIG. 5 is that the customer can now interactively order his or her merchandise, food, drinks, etc., etc. without having to go through the wait staff. Each mobile computing device is authenticated to the POS 130 to thereby allow the menu application running on the mobile computing device to place orders and to have those orders forwarded to the relevant staff at the establishment. As an example, in a restaurant environment, a customer can, using the mobile computing device, select drinks, appetizers, entrees, and desserts from the menu items presented to him/her. These customer choices are then transmitted to the POS system and an indication as to which table ordered these items is provided to the POS. Once the food and drinks are ready, the wait staff merely has to check which table ordered the items before delivering them to the specific table. Customers using such a system would no longer need to wait for wait staff to provide them with menus, or to take their orders with the attendant risk that the wait staff will make a mistake regarding the order.

Payment for the order made by the customer may be by traditional means where the wait staff brings the bill to the table or payment may be made by using a secure channel between the mobile computing device and the POS system and a suitable application which works with the menu provision system described above. The customer, when done eating, can merely indicate on the mobile computing device, that he or she is ready for the bill. The bill can then be provided to the customer by way of the mobile computing device in much the same manner as the menu items were previously provided. Of course, the bill would be coming from the POS system as this system has a record of what was purchased by the customer. Once the customer has been provided with the bill, the customer may be provided with a number of options for payment. As an example, the customer can be given the option to key in or swipe his credit card number using a suitable card reader attachment to the mobile device (along with any other suitable identification indicia), key in or swipe his or her debit or bank card, again using the suitable card reader, or the customer can be given the option of paying cash to a wait staff member who will be paged by way of the mobile computing device.

As an alternative to the above, the payment process using the mobile computing devices may be completely separate from the POS system. As an example, the payment system may use a payment server (either remote from the retail establishment or on location) so that payments are made without reference to the POS system—the orders may be run through the POS system so that the orders can be fulfilled and the items ordered by the customer are temporarily stored on the mobile computing device. When ready to pay the bill, the customer requests the bill through the mobile computing device and he/she is then presented with it using the mobile computing device. The payment can then be made using the device by having the customer swipe his card or enter his debit or credit card data on to the device. The payment is then routed through the payment server which communicates and coordinates with the relevant servers to automatically debit the relevant credit card or bank account.

It should be noted that the above system using the POS may also be implemented in other retail environments where the customer can order items and services using the menu system. The items and/or services can then be delivered to the customer either at a booth at the retail establishment or the customer can pick them up at a pick up center. Alternatively, other methods for delivery of goods and services to the customer can be used.

Regarding the mobile computing devices, it was noted above that tablet computing devices were the preferred implementation for such devices. The concept is that the devices are to be provided to the customer while the customer is on the retail premises. However, one alternative would be for customers to bring in their own mobile computing devices for use with the retail establishment's LAN or for use with communicating with the database server. The customer's own mobile computing device (such as a smartphone or any other computing device capable of executing the menu provision application used on the establishment provided mobile computing device) would automatically install the menu provision application and can be temporarily authenticated with the database menu while on the establishment premises. Such an authentication can be accomplished by accessing the mobile computing device's GPS subsystem and, if the device is located within a predetermined distance from the establishment, the device is authenticated. In conjunction with the device's GPS subsystem, if the device is accessing the database server using the establishment's wireless LAN (and thereby the wireless LAN's network address), this can be used as a further authentication proof that the device is within the establishment's premises. The authentication can also be done using other GPS-like location services via, as an example, network triangulation, radio based location techniques and technologies, and other techniques which may involve wireless LANs, 3G cellular telephone technology, Bluetooth, and other suitable methods and devices.

In another variant of the system 10, the mobile computing devices may not use a LAN to access the database server. The mobile computing device may be equipped with a suitable 3G wireless communications subsystem which allows the device to directly access the Internet without the need for a LAN gateway. Of course, for this variation, other security protocols may be implemented to ensure that the mobile computing device accessing the database server is actually within the establishment premises or is actually properly authenticated.

While the above description clearly contemplates a wireless communications path from the mobile computing device to either an endpoint or to a LAN, in another embodiment, the link between each mobile computing device and the information infrastructure inside the retail premises may be wired. Each mobile computing device may be hardwired to connect to the retail establishment's LAN and, through that LAN be capable of connecting to the database server. Any combination of wired and wireless links between the mobile computing device and the database server may be used.

It should be noted that the various menu related data items in the database server may be amended or adjusted remotely by an administrative user. Using a secure transmission protocol and a suitable web browser, an administrative user can edit, adjust, add, and change the menu related data items so that the menu items being presented to the customers are up to date and in real-time as possible. As an example, if a special price or a special menu item is to be provided as an option to the customer, the administrative user can log into the database server and insert that price or item into the suitable field. Once inserted and the changes committed, the changed menu can be propagated to the various mobile computing devices in real-time. In one scenario, a restaurant chain can have a promotion where the price of an appetizer drops 2% for every touchdown scored in a football game such as the SuperBowl. Instead of having the wait staff determine what the final price for that appetizer is, the administrative user can continuously adjust the price for the appetizer as the game progresses. The customers are then provided with the latest prices for various menu items in real-time.

To prevent issues with stale data in the database server and in the various mobile computing devices, changes to the menu related data items are not reflected on the data transmitted from the database server to mobile computing devices until the administrative user has fully completed any changes. This is done by having the administrative user work on a clone of the database while another "live" version of the database on the database server is being used by the various mobile computing devices. Once all the changes to the data have been effected, the administrative user then switches the edited database data with the "live" database data (i.e. the changes are committed to the database) so that the edited database data is now the "live" database data.

In one implementation, the database management system may be a Postgres ORDBMS system and/or an SQLite DBMS and LAN Management Servers may be used to manage the various server components in the system.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components. Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

Having thus described the invention, what is claimed as new and secured by Letters Patent is:

1. A system for providing menus to customers in a retail establishment, the system comprising:

a plurality of mobile computing devices, each mobile computing device being for use by one or more of said customers;
a database server containing a live database having menu related data, said menu related data being sent to said plurality of computing devices for presentation to said customers and said database server further containing a clone of said live database, said clone of said live database being a copy of said live database;
wherein
each of said plurality of mobile computing devices being for coupling to said database server to receive said menu related data by way of said live database;
each of said plurality of mobile computing devices is authenticated to said database server to thereby allow each of said plurality of mobile computing devices to receive said menu related data;
each one of said plurality of mobile computing devices presents menu items to said customers, said menu items being based on said menu related items;
said menu related data comprises data related to different menu items and menu prices and each of said different menu items and menu prices are individually editable by an administrative user of said database server by editing said clone;
said retail establishment is a restaurant;
changes made to said menu related data by said administrative user are made and completed on said clone of said live database;
said clone of said live database is automatically switched with said live database only when changes to said menu related data are completed on said clone.

2. The system according to claim 1 wherein menu items and menu prices are transmitted to each one of said plurality of mobile computing devices in real-time.

3. The system according to claim 1 wherein at least one of said plurality of mobile computing devices is for wirelessly coupling to said database server.

4. The system according to claim 1 wherein at least one of said plurality of mobile computing devices presents a customer with an interactive menu using said menu related data.

5. The system according to claim 4 wherein said mobile computing device presenting said interactive menu is in data communication with a point-of-sale system to thereby allow said customer to order items from said interactive menu.

6. The system according to claim 5 wherein said interactive menu provides said customer with a plurality of payment options for said items, at least one payment option involving paying using said mobile computing device.

7. The system according to claim 1 wherein said plurality of mobile computing devices communicates with said database server using a secure communications protocol.

8. The system according to claim 1 wherein edits performed by said administrative user on said menu related data is transmitted from said database server to said plurality of mobile computing devices only after said administrative user commits said edits to said clone and said clone has been switched with said live database.

9. The system according to claim 1 wherein at least one of said plurality of mobile computing devices communicates with said database server through the Internet.

10. The system according to claim 1 wherein a presentation of said menu items includes advertising.

11. The system according to claim 1 wherein at least one mobile computing device is authenticated when said at least one mobile computing device is in a vicinity of said retail establishment.

* * * * *